US012654192B2

(12) United States Patent
Shen et al.

(10) Patent No.: US 12,654,192 B2
(45) Date of Patent: Jun. 16, 2026

(54) GLUE COATING EQUIPMENT, BATTERY PRODUCTION LINE AND GLUE COATING METHOD

(71) Applicant: CONTEMPORARY AMPEREX TECHNOLOGY (HONG KONG) LIMITED, Hong Kong (CN)

(72) Inventors: Yafei Shen, Ningde (CN); Xueqing Gong, Ningde (CN); Fanke Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/826,771

(22) Filed: Sep. 6, 2024

(65) Prior Publication Data

US 2024/0424516 A1      Dec. 26, 2024

Related U.S. Application Data

(63) Continuation of application No. PCT/CN2024/074969, filed on Jan. 31, 2024.

(30) Foreign Application Priority Data

Jun. 21, 2023      (WO) ................ PCT/CN2023/101879

(51) Int. Cl.
  B05B 15/70      (2018.01)
  C09J 5/00      (2006.01)
  H01M 10/04      (2006.01)
(52) U.S. Cl.
  CPC ................. B05B 15/70 (2018.02); C09J 5/00 (2013.01); H01M 10/04 (2013.01)

(58) Field of Classification Search
  CPC ... B05B 15/70; B05B 12/122; B05B 13/0431; C09J 5/00; H01M 10/04; H01M 10/0404; B25J 11/0075; B25J 19/0025; F16L 3/01
  See application file for complete search history.

(56) References Cited

U.S. PATENT DOCUMENTS

| | | | |
|---|---|---|---|
| 3,871,280 | A | 3/1975 | Glaser |
| 2002/0015786 | A1 | 2/2002 | Nasli-Bakir et al. |
| 2016/0059257 | A1 | 3/2016 | Diskin |

FOREIGN PATENT DOCUMENTS

| | | |
|---|---|---|
| CN | 203737467 U | 7/2014 |
| CN | 104971862 A | 10/2015 |

(Continued)

OTHER PUBLICATIONS

The World Intellectual Property Organization (WIPO) International Search Report and Written Opinion for PCT/CN2023/101879 Dec. 15, 2023 14 Pages (including translation).

(Continued)

*Primary Examiner* — Alexander M Weddle
(74) *Attorney, Agent, or Firm* — ANOVA LAW GROUP, PLLC

(57) ABSTRACT

Glue coating equipment includes a glue nozzle device, a glue hose and a support device. The glue nozzle device is used to output a glue liquid. The glue nozzle device is configured to be movably arranged to coat the glue liquid over the surface of a workpiece. The glue hose is connected to the glue nozzle device to deliver the glue liquid to the glue nozzle device. The support device is used to support and bear the glue hose. The support device includes a bracket and a movable arm rotatably connected to the bracket, and the glue hose is installed on the movable arm. The support device is provided to support and bear the glue hose, the (Continued)

movable arm of the support device rotates relative to the bracket, and the glue hose is installed on the movable arm.

12 Claims, 5 Drawing Sheets

(56) References Cited

FOREIGN PATENT DOCUMENTS

| | | | | | |
|---|---|---|---|---|---|
| CN | 205199860 | U | | 5/2016 | |
| CN | 105921374 | A | | 9/2016 | |
| CN | 106733425 | A | * | 5/2017 | ............. B05D 3/067 |
| CN | 106881242 | A | * | 6/2017 | ......... B05C 11/1005 |
| CN | 207056917 | U | | 3/2018 | |
| CN | 207076618 | U | | 3/2018 | |
| CN | 207254658 | U | | 4/2018 | |
| CN | 208951205 | U | * | 6/2019 | |
| CN | 210159882 | U | | 3/2020 | |
| CN | 211726386 | U | * | 10/2020 | .......... B25J 11/0075 |
| CN | 211989455 | U | | 11/2020 | |
| CN | 215313540 | U | | 12/2021 | |
| CN | 216173710 | U | | 4/2022 | |
| CN | 216756349 | U | | 6/2022 | |
| JP | H04349967 | A | | 12/1992 | |
| JP | 2004283799 | A | | 10/2004 | |

OTHER PUBLICATIONS

The World Intellectual Property Organization (WIPO) International Search Report and Written Opinion for PCT/CN2024/074969 May 3, 2024 14 Pages (including translation).
The European Patent Office (EPO) The Extended European Search Report for Application No. 24728103.3 May 21, 2025 61 Pages.
The European Patent Office (EPO) Communication pursuant to Article 94(3) EPC for 24728103.3 Dec. 23, 2025 7 Pages.

* cited by examiner

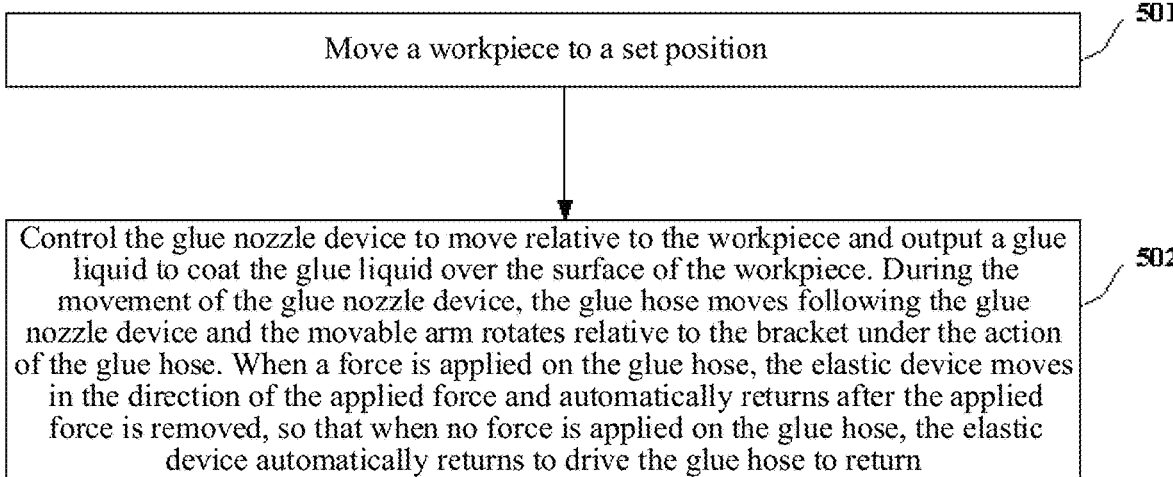

Move a workpiece to a set position                                501

Control the glue nozzle device to move relative to the workpiece and output a glue liquid to coat the glue liquid over the surface of the workpiece. During the movement of the glue nozzle device, the glue hose moves following the glue nozzle device and the movable arm rotates relative to the bracket under the action of the glue hose. When a force is applied on the glue hose, the elastic device moves in the direction of the applied force and automatically returns after the applied force is removed, so that when no force is applied on the glue hose, the elastic device automatically returns to drive the glue hose to return                                502

GLUE COATING EQUIPMENT, BATTERY PRODUCTION LINE AND GLUE COATING METHOD

CROSS-REFERENCE TO RELATED APPLICATIONS

This application is a continuation of International Application No. PCT/CN2024/074969, filed on Jan. 31, 2024, which is based on and claims priority to International Application No. PCT/CN2023/101879 filed on Jun. 21, 2023, the entire disclosures of both of which are incorporated herein by reference.

TECHNICAL FIELD

The present application relates to the technical field of glue coating, and in particular, to glue coating equipment, a battery production line, and a glue coating method.

BACKGROUND

In the battery production and manufacture process, glue coating equipment is commonly used to coat glue over the part to be glued. For example, glue is coated during battery assembly to realize the connection between components.

In order to ensure the glue coating area, the glue nozzle of the glue coating equipment needs to be moved to multiple positions. During the movement of the glue nozzle, it is a problem to be solved urgently to ensure the stability of glue delivery.

SUMMARY

In view of the problem mentioned above, the present application provides glue coating equipment, a battery production line, and a glue coating method to effectively ensure the stability of glue delivery.

In a first aspect, the present application provides glue coating equipment, which includes a glue nozzle device, a glue hose and a support device. The glue nozzle device is used to output a glue liquid. The glue nozzle device is configured to be movably arranged to coat the glue liquid over the surface of the workpiece. The glue hose is connected to the glue nozzle device to deliver the glue liquid to the glue nozzle device. The support device is used to support and bear the glue hose. The support device includes a bracket and a movable arm rotatably connected to the bracket, and the glue hose is installed on the movable arm.

In the technical solution of an embodiment of the present application, a support device is provided to support and bear the glue hose, the movable arm of the support device rotates relative to the bracket, and the glue hose is installed on the movable arm, so that when the glue nozzle device moves to coat the glue, the end of the glue hose connected with the glue nozzle device also moves following the glue nozzle device, thereby causing the entire glue hose to move under tension. Since the glue hose is installed on the movable arm, when the movable arm rotates relative to the bracket under the gravity of the glue hose, the glue hose is enabled to move following the glue nozzle device, and the glue liquid is delivered to the glue nozzle device through the glue hose. Therefore, there is no need to set the glue hose to be long, and the glue liquid contained in the glue hose can be substantially delivered directly to the glue nozzle device, so that the accurately dosed glue liquid can all be delivered to the glue nozzle device, thereby improving the stability of glue delivery.

In some embodiments, the support device further includes a rotary shaft provided on the bracket. The rotary shaft extends in the vertical direction, and the movable arm is configured to rotate around the rotary shaft. The movable arm is configured to rotate around a vertical axis. This enables the glue hose to be driven by the movable arm to movable in the horizontal plane, with a wider range of movement, and consequently move better following the glue nozzle device.

In some embodiments, the support device further includes an elastic device provided on the movable arm. A first end of the elastic device is connected to the movable arm, and a second end of the elastic device has the glue hose installed thereon. The elastic device is provided on the movable arm. The elastic device is used to install the glue hose. The first end and the second end of the elastic device are telescopically arranged. When a force is applied on the glue hose, the elastic device moves in the direction of the applied force, and it automatically returns after the applied force is removed. In this way, when no force is applied on the glue hose, the elastic device automatically returns and then drives the glue hose to return so as to avoid damage to the glue hose caused by collision between it and other components during operation.

In some embodiments, a guide rail is provided on the movable arm. The extension direction of the guide rail is arranged to intersect with the rotation axis of the movable arm, and the elastic device is slidably arranged along the guide rail. The elastic device is used to install the glue hose, so that when the glue hose is pulled by the glue nozzle device, it drives the elastic device to move along the guide rail, thereby allowing the glue hose to follow the position of the glue nozzle device. The extension direction of the guide rail is set to intersect with the rotation axis of the movable arm, so that the glue hose can follow the position of the glue nozzle device in multiple degrees of freedom.

In some embodiments, the extension direction of the guide rail is perpendicular to the rotation axis of the movable arm. Such an arrangement enables the glue hose to follow the position of the glue nozzle device in the horizontal plane.

In some embodiments, the support device further includes a glue hose fixing block. The glue hose fixing block is arranged at the second end of the elastic device, and the glue hose fixing block has a fixing hole for the glue hose to pass through. The glue hose fixing block is fixedly connected to the second end of the elastic device, and the glue hose fixing block is provided with a fixing hole running through along the thickness direction of the glue hose fixing block. The glue hose passes through the fixing hole. The fixing hole is provided to form a position limiter for the glue hose, and when the glue hose is pulled by the glue nozzle device, the glue hose applies an acting force on the elastic device through the fixing hole.

In some embodiments, the glue hose includes a first glue hose for delivering a first glue liquid and a second glue hose for delivering a second glue liquid. The glue hose fixing block has a first fixing hole for the first glue hose to pass through and a second fixing hole for the second glue hose to pass through. The glue nozzle device is used to mix and spray the first glue liquid delivered by the first glue hose and the second glue liquid delivered by the second glue hose. The first glue hose and the second glue hose are both fixedly arranged on the glue hose fixing block so that both glue hoses can move following the glue nozzle device at the same time, ensuring the synchronization of movement of the two glue hoses and further improving the stability of glue delivery.

In some embodiments, the elastic device includes an elastic balancer. The elastic device is configured as an elastic balancer, so that the glue coating equipment of the embodiment of the present application has a simple and compact structure. Moreover, the elastic balancer can bear a great force limit, which makes the glue coating equipment of the embodiment of the present application applicable to large-scale glue coating scenes.

In some embodiments, the glue coating equipment further includes a moving device. The moving device is configured to drive the glue nozzle device to move. The moving device drives the glue nozzle device to move according to the shape and position of the workpiece. Moreover, the moving device is further configured to move according to the glue discharging speed for coating, thereby improving the glue coating quality.

In some embodiments, the glue coating equipment further includes a feeding device. The feeding device is used to supply the glue liquid to the glue hose.

In some embodiments, the feeding device includes a delivery device, a transfer device and a dosing device. The delivery device is used to deliver the glue liquid to the transfer device, the transfer device is used to stir the glue liquid and deliver the glue liquid to the dosing device, and the dosing device is configured to deliver the glue liquid to the glue nozzle device on demand. The feeding device of the embodiment of the present application can stir the glue liquid by the transfer device to improve the uniformity of the glue liquid, and can accurately dose the amount of the delivered glue liquid by the dosing device to ensure the quality of glue coating.

In some embodiments, the glue coating equipment includes glue coating equipment for battery pack box. The glue coating equipment for battery pack box is used to coat glue over the lower box of the battery pack for connecting and fixing the bottom of the battery cell to the lower box.

In a second aspect, the present application provides a battery production line including the glue coating equipment described above. The glue coating equipment is used to coat glue over the surface of a battery.

In a third aspect, the present application provides a glue coating method, including the steps of:

moving a workpiece to a set position; and controlling a glue nozzle device to move relative to the workpiece and output a glue liquid to coat the glue liquid over the surface of the workpiece. During the movement of the glue nozzle device, a glue hose moves following the glue nozzle device and a movable arm rotates relative to the bracket under the action of the glue hose.

In some embodiments, the glue coating method further includes: after moving the workpiece to a set position, acquiring an image of the workpiece by an image acquisition device to obtain the start position of glue coating for the workpiece.

In some embodiments, controlling the glue nozzle device to move relative to the workpiece and outputting the glue liquid to coat the glue liquid over the surface of the workpiece includes: controlling the glue nozzle device to move from the start position of glue coating and controlling the glue nozzle device to output the glue liquid during the movement.

The above description is only an overview of the technical solutions of the present application. In order to enable clearer understanding of the technical means of the present application to implement the same according to the contents of the specification, and in order to enable the above and other objectives, features and advantages of the present application to be more obvious and comprehensible, specific embodiments of the present application are exemplified below.

DESCRIPTION OF DRAWINGS

In order to illustrate the technical solutions of the embodiments of the present application more clearly, the drawings required in the embodiments of the present application will be briefly introduced below. Obviously, the drawings described below represent only some embodiments of the present application. For those of ordinary skill in the art, other drawings can also be obtained according to the drawings without any creative effort.

FIG. 5 is a schematic flowchart of a glue coating method according to some embodiments of the present application.

Figure 1:
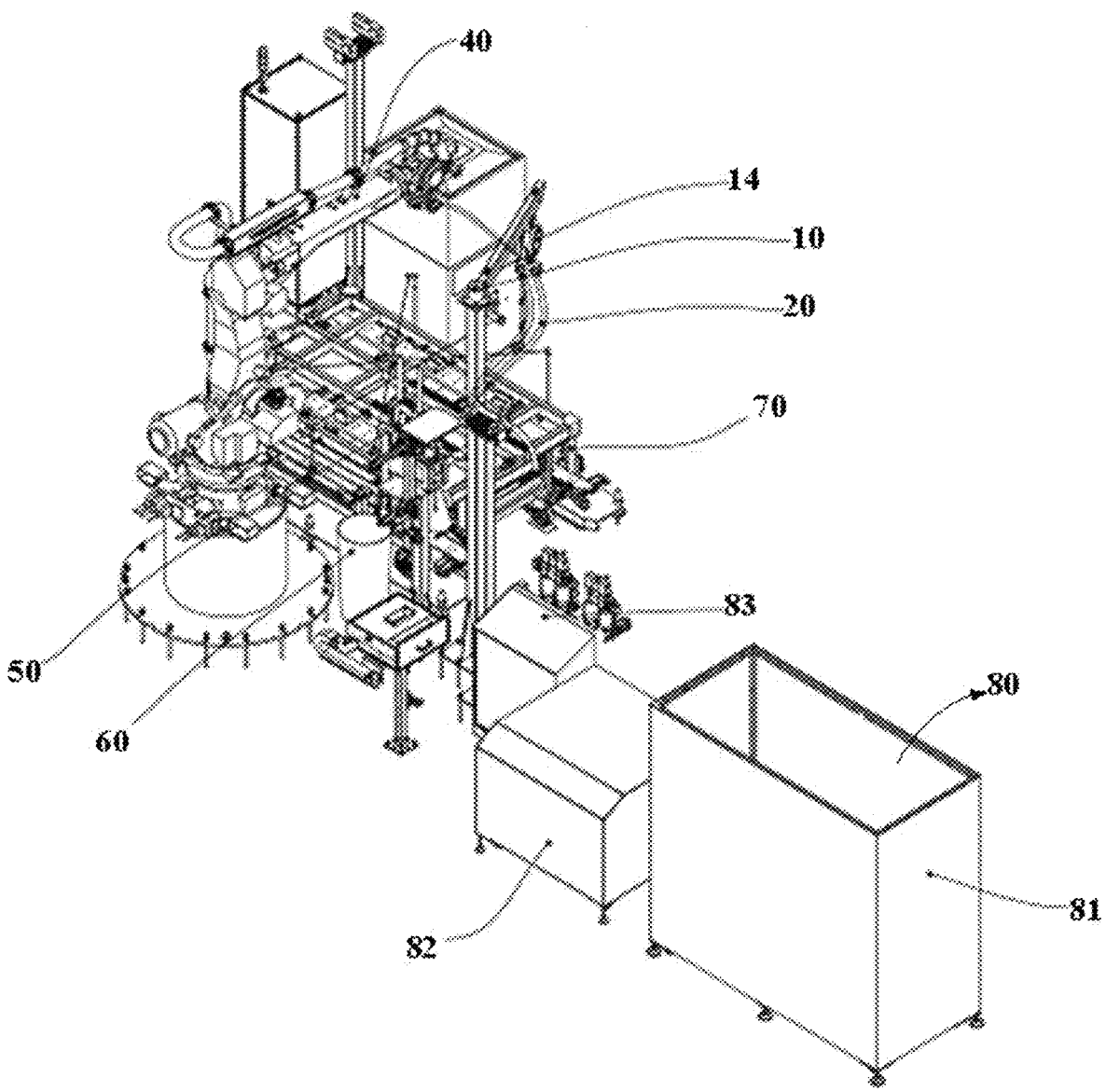
FIG. 1 is a schematic structural perspective view of glue coating equipment according to some embodiments of the present application.

In the drawings, the figures are not necessarily drawn to actual scale.

DESCRIPTION OF REFERENCE NUMERALS

10. Support device; 11. Bracket; 12. Movable arm; 13. Rotary shaft; 14. Elastic device; 15. Glue hose fixing block; 151. First fixing hole; 152. Second fixing hole; 16. Guide rail;
20. Glue hose; 21. First glue hose; 22. Second glue hose;
40. Moving device;
50. Glue nozzle device;
60. Waste glue bucket;
70. Jacking device;
80. Feeding device; 81. Delivery device; 82. Transfer device; 83. Dosing device.

DETAILED DESCRIPTION

Unless otherwise defined, all technical and scientific terms used herein have the same meaning as commonly understood by those skilled in the art belonging to the technical field of the present application. The terms used herein are intended only for the purpose of describing specific embodiments and are not intended to limit the present application. The terms "including" and "having" and any variations thereof in the specification and the claims of the present application and in the description of drawings above are intended to cover non-exclusive inclusion.

In the description of the embodiments of the present application, the technical terms "first," "second," and the like are used only to distinguish between different objects, and are not to be understood as indicating or implying a relative importance or implicitly specifying the quantity, particular order, or primary and secondary relation of the technical features indicated. In the description of the embodiments of the present application, the meaning of "a plurality of" is two or more, unless otherwise explicitly and specifically defined.

Reference herein to an "embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, unless otherwise expressly specified and defined, the technical terms "mount," "join," "connect," "fix," and the like should be understood in a broad sense, such as, a fixed connection, a detachable connection, or an integral connection; a mechanical connection, or an electrical connection; a direct connection, an indirect connection through an intermediate medium, internal communication between two elements, or interaction between two elements. Those of ordinary skill in the art can understand the specific meanings of the above terms in the embodiments of the present application according to specific situations.

In the present application, a battery cell may include a lithium-ion secondary battery, a lithium-ion primary battery, a lithium-sulfur battery, a sodium-lithium-ion battery, a sodium-ion battery, a magnesium-ion battery, or the like, which is not limited by the embodiments of the present application. The battery mentioned in the embodiments of the present application refers to a single physical module including one or more battery cells to provide a higher voltage and capacity. For example, the battery mentioned in the present application may include a battery module or a battery pack, etc.

The battery generally includes a box for encapsulating one or more battery cells. The box can prevent liquid or other foreign matters from affecting charging or discharging of the battery cells.

The battery cell includes an electrode assembly and an electrolytic solution, and the electrode assembly is composed of a positive electrode plate, a negative electrode plate and a separator. The battery cell operates mainly relying on movement of metal ions between the positive electrode plate and the negative electrode plate. The positive electrode plate includes a positive electrode current collector and a positive electrode active material layer. A surface of the positive electrode current collector is coated with the positive electrode active material layer. The parts, not coated with the positive electrode active material layer, of the positive electrode current collector protrude from the part, coated with the positive electrode active material layer, of the positive current collector, and the parts, not coated with the positive electrode active material layer, of the positive electrode current collector serve as positive tabs. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode plate includes a negative electrode current collector and a negative electrode active material layer. A surface of the negative electrode current collector is coated with the negative electrode active material layer. The parts, not coated with the negative electrode active material layer, of the negative electrode current collector protrude from the part, coated with the negative electrode active material layer, of the negative electrode current collector, and the parts, not coated with the negative electrode active material layer, of the negative electrode current collector serve as negative tabs. The material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. The separator may be made from polypropylene (PP), polyethylene (PE), or the like. In addition, the electrode assembly may be of a wound structure or a stacked structure, and the embodiments of the present application are not limited thereto.

In related art, glue coating equipment is commonly used to perform glue coating operations on a part to be coated with glue. For example, in the production and manufacture of batteries, glue is usually coated during battery assembly to realize the connection between various components.

In order to ensure the glue coating area, the glue nozzle device of the glue coating equipment needs to be moved to multiple positions through a driving structure such as a robot. The glue nozzle device is connected to the glue hose so that the glue liquid is delivered to the glue nozzle device by the glue hose. In related art, the glue hose needs to be set very long to ensure that the glue nozzle device can move within a wide range to supply glue. During the research, it was found that if the glue hose is set very long, the glue hose will be coiled in many turns, so that a great amount of glue is contained in the glue hose, resulting in inaccurate dosing of the amount of glue liquid and consequently inability to achieve stability in glue supply.

In order to solve the above problems, the technical solution of the embodiments of the present application is proposed after in-depth research. Referring to FIG. 1, glue coating equipment provided by an embodiment of the present application supports a glue hose by providing a support device, and a movable arm of the support device is arranged to be rotatable relative to the bracket, so that when the glue nozzle device moves, the glue hose is pulled by the glue nozzle device to move, and the gravity of the glue hose drives the movable arm to rotate relative to the bracket, thereby enabling the glue hose to follow the position of the glue nozzle device. As such, the stability of glue supply can be effectively ensured in the condition of accurate dosing while eliminating the need to set the glue hose to be long.

The structure and operation process of the glue coating equipment according to the embodiments of the present application are described in detail below with reference to FIGS. 1 to 4.

As shown in FIG. 1, the glue coating equipment according to the embodiments of the present application includes a glue nozzle device 50, a glue hose 20, and a support device 10. The glue nozzle device 50 is used to output a glue liquid. The glue nozzle device 50 is configured to be movably arranged to coat the glue liquid over the surface of the workpiece. The glue hose 20 is connected to the glue nozzle device 50 to deliver the glue liquid to the glue nozzle device 50. The support device 10 is used to support and bear the glue hose 20. The support device 10 includes a bracket 11 and a movable arm 12 rotatably connected to the bracket 11. The glue hose is installed on the movable arm.

Figure 2:
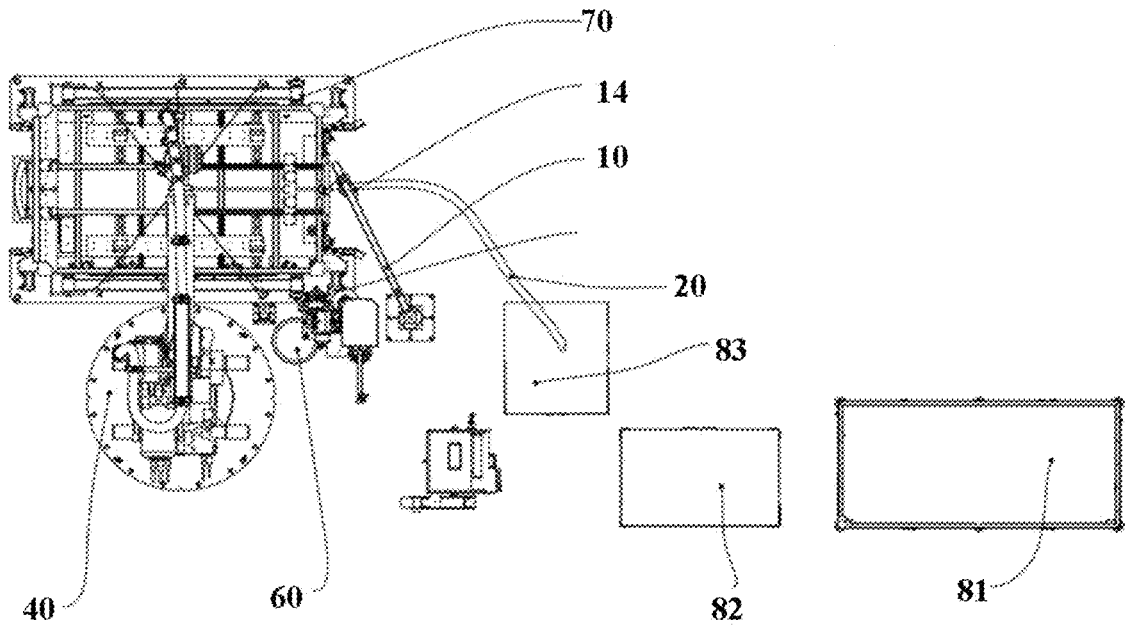
FIG. 2 is a schematic structural top view of glue coating equipment according to some embodiments of the present application.
Figure 3:
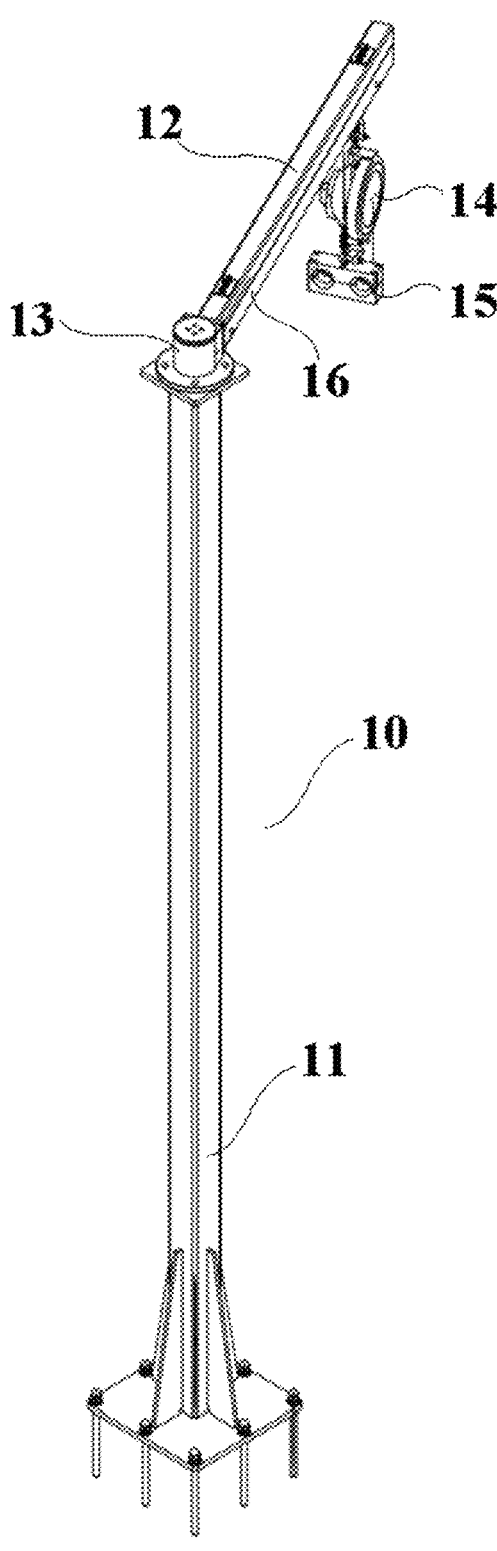
FIG. 3 is a schematic structural view of a support device according to some embodiments of the present application.

As shown in FIGS. 1 to 3, in the glue coating equipment provided by embodiments of the present application, the support device 10 is provided to support and bear the glue hose 20, and the movable arm 12 of the support device 10 rotates relative to the bracket 11, the glue hose 20 being installed on the movable arm 12, so that when the glue nozzle device 50 moves to coat the glue, the end of the glue hose 20 connected with the glue nozzle device 50 also moves following the glue nozzle device 50, causing the entire glue hose 20 to move under tension. Since the glue hose 20 is installed on the movable arm 12, the movable arm 12 rotates relative to the bracket 11 under the gravity of the glue hose 20, so that the glue hose 20 moves following the glue nozzle device 50, and the glue liquid is delivered to the glue nozzle device 50 through the glue hose 20. Therefore, there is no need to set the glue hose 20 to be long, and the glue liquid contained in the glue hose 20 can be substantially delivered directly to the glue nozzle device 50, so that the accurately dosed glue liquid can all be delivered to the glue nozzle device 50, thereby improving the stability of glue delivery.

In some embodiments, the support device 10 further includes an elastic device 14. The first end of the elastic device 14 is connected to the movable arm 12, and the second end of the elastic device 14 has the glue hose 20 installed thereon. In the technical solution of the embodiment of the present application, the elastic device 14 is provided on the movable arm 12. The elastic device 14 is used to install the glue hose 20. The first end and the second end of the elastic device 14 are telescopically arranged. When a force is applied on the glue hose 20, the elastic device 14 moves in the direction of the applied force, and it automatically returns after the applied force is removed. In this way, when no force is applied on the glue hose 20, the elastic device 14 automatically returns and then drives the glue hose 20 to return so as to avoid damage to the glue hose 20 caused by collision between it and other components during operation.

As shown in FIG. 3, in a specific embodiment, the bracket 11 is a column extending in the vertical direction. In other embodiments not shown in the drawings, the bracket 11 may also be another structure, such as a column with an angle between its extension direction and the vertical direction, a body structure, or the like. The bracket 11 serves to support the movable arm 12.

The movable arm 12 is rotatably connected to the bracket 11. FIG. 3 exemplarily shows that the extension direction of the movable arm 12 is arranged perpendicular to the extension direction of the bracket 11. In other embodiments not shown in the drawings, the extension direction of the movable arm 12 may also be arranged at an angle with respect to the extension direction of the bracket 11, as long as the movable arm 12 can rotate relative to the bracket 11 so that the glue hose 20 can move in real time following the glue nozzle device 50.

In some embodiments, as shown in FIG. 3, the support device 10 further includes a rotary shaft 13 provided on the bracket 11. The rotary shaft 13 extends in the vertical direction, and the movable arm 12 is configured to rotate around the rotary shaft 13. That is, the movable arm 12 is configured to rotate around a vertical axis. This enables the glue hose 20 to be driven by the movable arm 12 to move in the horizontal plane, with a wider range of movement, and consequently better move following the glue nozzle device 50.

In some other embodiments, the rotation axis of the movable arm 12 may also be at an angle with respect to the vertical direction.

Specifically, as shown in FIG. 3, the rotary shaft 13 is provided at the top of the bracket 11. The movable arm 12 has its first end sleeved on the rotary shaft 13 to rotate around the rotary shaft 13. The second end of the movable arm 12 is freely arranged.

In some embodiments, a guide rail 16 is provided on the movable arm 12. The extension direction of the guide rail 16 is arranged to intersect with the rotation axis of the movable arm 12, and the elastic device 14 is arranged to be slidable along the guide rail 16. The elastic device 14 is used to install the glue hose 20, so that when the glue hose 20 is pulled by the glue nozzle device 50, it drives the elastic device 14 to move along the guide rail 16, thereby allowing the glue hose 20 to follow the position of the glue nozzle device 50. The extension direction of the guide rail 16 is arranged to intersect with the rotation axis of the movable arm 12, so that the glue hose 20 can follow the position of the glue nozzle device 50 in multiple degrees of freedom.

As shown in FIG. 3, in some embodiments, the extension direction of the guide rail 16 is perpendicular to the rotation axis of the movable arm 12. Specifically, the rotation axis of the movable arm 12 extends in the vertical direction, and the extension direction of the guide rail 16 is the horizontal direction, so that the glue hose 20 can move following the glue nozzle device 50.

Referring to FIG. 3, the initial position of the elastic device 14 is close to the free end of the movable arm 12. In this way, when the glue hose 20 is pulled by the glue nozzle device 50 to move, the glue hose 20 exerts a large torque on the movable arm 12 and drives the movable arm 12 to move. At the same time, the elastic device 14 can move along the guide rail 16. Specifically, for example, the elastic device 14 is provided with a slider that is in sliding fit with the guide rail.

Figure 4:
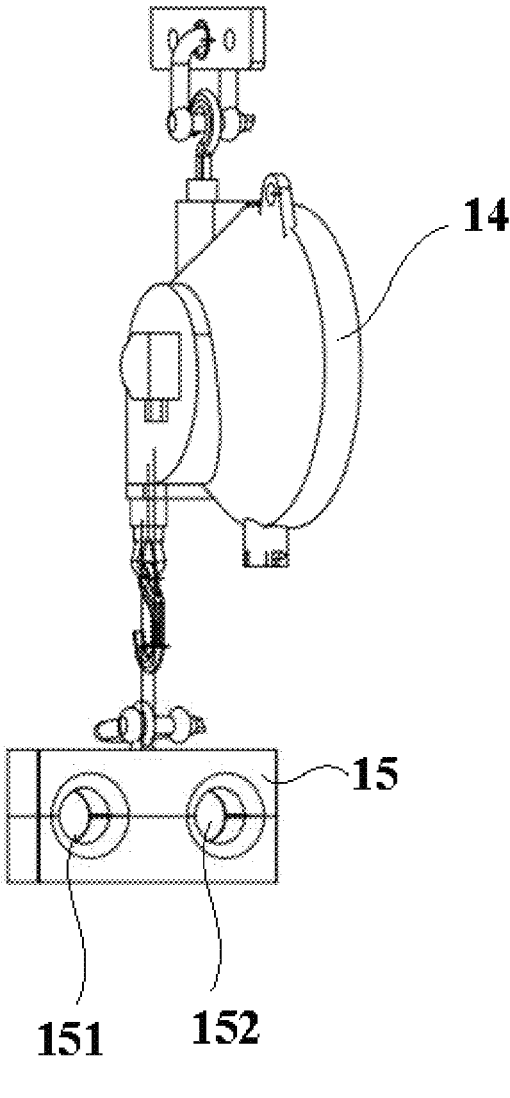
FIG. 4 is a schematic partial structural view of a support device according to some embodiments of the present application.

In some embodiments, as shown in FIG. 4, the support device 10 further includes a glue hose fixing block 15. The glue hose fixing block 15 is provided at the second end of the elastic device 14. The glue hose fixing block 15 has a fixing hole for the glue hose 20 to pass through. The glue hose fixing block 15 is fixedly connected to the second end of the elastic device 14, and the glue hose fixing block 15 is provided with a fixing hole running through along the thickness direction of the glue hose fixing block 15. The glue hose 20 passes through the fixing hole, and the fixing hole is provided to form a position limiter for the glue hose 20, and when the glue hose 20 is pulled by the glue nozzle device 50, the glue hose 20 applies an acting force on the elastic device 14 through the fixing hole.

In some embodiments, the glue hose 20 includes a first glue hose 21 for delivering a first glue liquid and a second glue hose 22 for delivering a second glue liquid. The glue hose fixing block 15 has a first fixing hole 151 for the first glue hose 21 to pass through and a second fixing hole 152 for the second glue hose 22 to pass through. The glue nozzle device 50 is used for mixing the first glue liquid delivered by the first glue hose 21 and the second glue liquid delivered by the second glue hose 22. Specifically, for example, the first glue hose 21 is used to deliver the glue A and the second glue hose 22 is used to deliver the glue B. The first glue hose 21 delivers the glue A to the glue nozzle device 50, and the second glue hose 22 delivers the glue B to the glue nozzle device 50. The glue nozzle device 50 mixes the glue A and the glue B and coat them over the surface of the workpiece. The first glue hose and the second glue hose are both fixedly arranged on the glue hose fixing block so that both glue hoses can move following the glue nozzle device at the same time, ensuring the synchronization of movement of the two glue hoses and further improving the stability of glue delivery.

In some embodiments, as shown in FIG. 4, the elastic device 14 includes an elastic balancer. The elastic device 14 is configured as an elastic balancer, so that the glue coating equipment in the embodiment of the present application has a simple and compact structure. Moreover, the elastic balancer can bear a large force limit, which makes the glue coating equipment of the embodiment of the present application applicable to large-scale glue coating scenes.

In some embodiments, the glue coating equipment further includes a moving device 40. The moving device 40 is configured to drive the glue nozzle device 50 to move. The moving device 40 drives the glue nozzle device 50 to move according to the shape and position of the workpiece. Moreover, the moving device 40 is further configured to move according to the glue discharging speed for coating, thereby improving the glue coating quality.

In some embodiments, the moving device 40 includes a robot. Movement control for a robot is more intelligent, thereby improving the accuracy of the movement of the glue nozzle device and improving the glue coating quality. The robot may be a six-axis robot. For example, the glue nozzle device 50 is fixedly arranged at the end of the operation arm of the six-axis robot. This allows the glue nozzle device 50 to move in multiple degrees of freedom.

In some embodiments, as shown in FIGS. 1 and 2, the glue coating equipment further includes a feeding device 80. The feeding device 80 is used to supply a glue liquid to the glue hose 20.

In some embodiments, the feeding device 80 includes a delivery device 81, a transfer device 82 and a dosing device 83. The delivery device 81 is used to deliver the glue liquid to the transfer device 82. The transfer device 82 is used to stir the glue liquid and deliver the glue liquid to the dosing device 83. The dosing device 83 is configured to deliver the glue liquid to the glue nozzle device 50 on demand. Specifically, the delivery device 81 is used to deliver the glue liquid automatically from the material bucket to the transfer device 82. The transfer device 81 is used to stir the glue liquid uniformly and remove air, and then deliver the glue liquid to the dosing device 83. The dosing device 83 is used to deliver the glue liquid to the glue nozzle device 50 and dose the amount of the glue liquid. The feeding device 80 in the embodiment of the present application is provided with the transfer device 81 to stir the glue liquid to improve the uniformity of the glue liquid, and accurately doses the amount of the delivered glue liquid through the dosing device 83 to ensure the quality of glue coating.

In some embodiments, the present application further provides a battery production line. The battery production line includes the glue coating equipment of the various embodiments described above. The glue coating equipment is used to coat glue over the surface of a battery. The battery surface may be the surface of the battery box or the surface of the battery cell.

In some embodiments, the glue coating equipment includes glue coating equipment for the battery pack box. The glue coating equipment for the battery pack box is used to coat glue over the lower box of the battery pack to achieve connection and fixation between the bottom of the battery cell and the lower box.

In some other embodiments, the glue coating equipment can also be used for, without limitation, glue coating for the connection point between battery cells, the connections between the battery cells, the connection between the side plate and the short plate, and the connection point between batteries, and other scenes that require glue coating.

Referring to FIG. 5, an embodiment of the present application further provides a glue coating method. The glue coating method according to the embodiment of the present application includes:

Step 501 of moving a workpiece to a set position; and

Step 502 of controlling the glue nozzle device 50 to move relative to the workpiece and output a glue liquid to coat the glue liquid over the surface of the workpiece. During the movement of the glue nozzle device 50, the glue hose moves following the glue nozzle device 50 and the movable arm 12 rotates relative to the bracket 11 under the action of the glue hose.

In the glue coating method of the embodiment of the present application, the workpiece is first moved to a set position, and then the glue nozzle device 50 is controlled to move relative to the workpiece to complete the coating of the glue liquid. The movement of the glue nozzle device 50 causes the glue hose to be pulled by the glue nozzle device 50 to move. Then the movable arm 12 to support the glue hose rotates relative to the bracket 11 under the action of the glue hose, thereby enabling the glue hose to follow the position of the glue nozzle device and consequently effectively ensuring the stability of glue supply in the condition of accurate dosing.

In some embodiments, the glue coating method further includes: after moving the workpiece to a set position, acquiring an image of the workpiece through an image acquisition device to obtain the start position of glue coating for the workpiece; and controlling the glue nozzle device 50 to move from the start position of glue coating and controlling the glue nozzle device 50 to output the glue liquid during the movement. Specifically, for example, an image of the workpiece is acquired through the image acquisition device and a coordinate system is established based on the image of the workpiece, thereby determining the start position, i.e., the coordinate information, of glue coating for the workpiece. The start position of glue coating is accurately acquired based on the image of the workpiece, and the start position of movement of the glue nozzle device 50 is guided based on the start position of glue coating, which is beneficial to improving the accuracy of glue coating. The structure of the glue coating equipment according to a specific embodiment of the present application is described in detail below with reference to FIGS. 1 to 4.

As shown in FIGS. 1 and 2, the glue coating equipment of the specific embodiment of the present application includes a support device 10, a glue hose 20, a moving device 40, a glue nozzle device 50, a waste glue bucket 60, a lifting device 70 and a feeding device 80.

Among them, the lifting device 70 allows locating of the position of the product through lifting and positioning, thereby facilitating the glue coating by the glue nozzle device 50.

The feeding device 80 includes a delivery device 81, a transfer device 82 and a dosing device 83. The feeding device 80 is used to supply a glue liquid to the glue hose 20. The delivery device 81 is used to deliver the glue liquid automatically from the material bucket to the transfer device 82. The transfer device 82 is used to stir the glue uniformly and remove air, and then deliver the glue liquid to the dosing device 83. The dosing device 83 is used to deliver the glue liquid to the glue nozzle device 50 and dose the amount of the glue liquid.

The glue nozzle device 50 is used to mix the glue A and glue B delivered by the first glue hose 21 and the second glue hose 22 and coat them over the surface of the workpiece.

The moving device 40 (e.g., a robot) is used to drive the glue nozzle device 50 to move on demand. Specifically, the moving speed of the moving device 40 is configured to be adapted to the glue discharging speed of the glue nozzle device 50.

As shown in FIGS. 3 and 4, the support device 10 includes a bracket 11, a movable arm 12, a rotary shaft 13, an elastic device 14, and a glue hose fixing block 15.

The rotary shaft 13 is provided at the top of the bracket 11. The first end of the movable arm 12 is rotatably connected to the rotary shaft 13, and the second end of the movable arm 12 is freely disposed. The elastic device 14 is mounted on the movable arm 12. The glue hose fixing block 15 is provided at the lower end of the elastic device 14. The glue hose passes through the glue hose fixing block 15. The elastic device 14 stretches upon receiving force and returns after the force disappears, thereby protecting the glue hose from damage.

The operation process of the glue coating equipment in this embodiment is as follows: the product is driven by an AGV vehicle to the set position, and the product is lifted and positioned through the lifting function of the lifting device 70. The robot takes a picture of the product to determine the start position of glue coating. The robot drives the glue nozzle device 50 to move and discharge glue synchronously. The movable arm 12 moves following the glue hose and rotates relative to the bracket 11, thereby following the movement of the glue nozzle device 50. After the glue coating is completed, the robot drives the glue nozzle device 50 back to its original position. At this time, the movable arm 12 also returns along with the glue hose. After the robot returns, the AGV vehicle drives the product away after receiving the leaving signal.

While the present application has been described with reference to some embodiments, various modifications may be made thereto and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. Glue coating equipment, comprising:
   a glue nozzle device for outputting a glue liquid and configured to be movably arranged to coat the glue liquid over the surface of a workpiece;
   a glue hose connected to the glue nozzle device to deliver the glue liquid to the glue nozzle device;
   a support device for supporting and bearing the glue hose, the support device comprising a bracket and a movable arm rotatably connected to the bracket, the glue hose being installed on the movable arm; and
   an elastic device provided on the movable arm, a first end of the elastic device being connected to the movable arm and a second end of the elastic device having the glue hose installed thereon;
   wherein the support device further comprises a glue hose fixing block, the glue hose fixing block is arranged at the second end of the elastic device, and the glue hose fixing block has a fixing hole for the glue hose to pass through.

2. The glue coating equipment according to claim 1, wherein the support device further comprises a rotary shaft provided on the bracket, and the movable arm is configured to rotate around the rotary shaft.

3. The glue coating equipment according to claim 1, wherein the movable arm is provided with a guide rail, the extension direction of the guide rail is arranged to intersect with the rotation axis of the movable arm, and the elastic device is slidably arranged along the guide rail.

4. The glue coating equipment according to claim 3, wherein the extension direction of the guide rail is perpendicular to the rotation axis of the movable arm.

5. The glue coating equipment according to claim 1, wherein the glue hose comprises a first glue hose for delivering a first glue liquid and a second glue hose for delivering a second glue liquid, the glue hose fixing block has a first fixing hole for the first glue hose to pass through and a second fixing hole for the second glue hose to pass through, and the glue nozzle device is used to mix and spray the first glue liquid delivered by the first glue hose and the second glue liquid delivered by the second glue hose.

6. The glue coating equipment according to claim 1, wherein the elastic device comprises an elastic balancer.

7. The glue coating equipment according to claim 1, further comprising:
   a moving device configured to drive the glue nozzle device to move.

8. The glue coating equipment according to claim 1, further comprising:
   a feeder for supplying the glue liquid to the glue hose.

9. The glue coating equipment according to claim 8, wherein the feeder comprises a delivery pipe, a stirrer and a dosing pump, the delivery pipe is used to deliver the glue liquid to the stirrer, the stirrer is used to stir the glue liquid and deliver the glue liquid to the dosing pump, and the dosing pump is configured to deliver the glue liquid to the glue nozzle device on demand.

10. A battery production line comprising the glue coating equipment of claim 1, the glue coating equipment being used to coat glue over the surface of a battery.

11. A glue coating method using the glue coating equipment according to claim 1, comprising:
   moving the workpiece to a set position; and
   controlling the glue nozzle device to move relative to the workpiece and output the glue liquid to coat the glue liquid over the surface of the workpiece, where during the movement of the glue nozzle device, the glue hose moves following the glue nozzle device and the movable arm rotates relative to the bracket under the action of the glue hose, and when a force is applied on the glue hose, the elastic device moves in the direction of the applied force and automatically returns after the force is removed, so that when no force is applied on the glue hose, the elastic device automatically returns to drive the glue hose to return.

12. The glue coating method according to claim 11, further comprising, after moving the workpiece to the set position:
   acquiring an image of the workpiece by an image acquisition device to obtain a start position of glue coating for the workpiece; and
   controlling the glue nozzle device to move from the start position of glue coating and controlling the glue nozzle device to output the glue liquid during the movement.

* * * * *